July 28, 1964 M. LAZAREFF 3,142,456
FLYING PLATFORM FAIRING
Filed Sept. 19, 1962 6 Sheets-Sheet 1

Inventor
Michel Lazareff
By Karl W. Flocks
Attorney

July 28, 1964

M. LAZAREFF 3,142,456

FLYING PLATFORM FAIRING

Filed Sept. 19, 1962

Inventor
Michel Lazareff
By Karl W. Flocks

July 28, 1964  M. LAZAREFF  3,142,456
FLYING PLATFORM FAIRING
Filed Sept. 19, 1962  6 Sheets-Sheet 3

INVENTOR
MICHEL LAZAREFF
BY Karl W. Flocks.
ATTORNEY

United States Patent Office  3,142,456
Patented July 28, 1964

3,142,456
FLYING PLATFORM FAIRING
Michel Lazareff, Paris, France, assignor to Nord-Aviation Societe Nationale de Constructions Aeronautiques, Paris, France, a joint-stock company of France
Filed Sept. 19, 1962, Ser. No. 224,763
Claims priority, application France Apr. 20, 1962
9 Claims. (Cl. 244—23)

The present invention relates to a fairing for flying platforms of the type capable of rising vertically and propelling itself following the orders of a human pilot or an automatic pilot, the propulsion system drawing-in the air and discharging it vertically downwards at an increased speed so as to create a vertical thrust.

With platforms which are known at the present time, equilibrium is obtained without difficulty as long as they remain stationary in an absolutely calm air. Since all the forces applied are vertical, the resultant of the lift forces and the weight is zero, as is also the resultant moment at the center of gravity.

Difficulties appear when there is relative movement of the platform and the air (assumed to be horizontal to simplify the explanation), which movement can result either from a voluntary action of the pilot or from an atmospheric disturbance (a gust of wind). While it is relatively easy to balance the reactions of horizontal impulses by known devices, deflectors placed in the outlet flux of the driving system, it is not easy to balance their moments. Studies have shown that the "control" moment necessary to act in opposition to the moment of the impulses is very large and would necessitate an auxiliary source of power acting with a large mechanical advantage.

The present invention has essentially for its object a platform of this type, in which the moment to be corrected is zero or at least small and does not necessitate the intervention of an external source of power for its compensation.

It has also for its object a platform having an inclination which can be maintained at zero, if so required, irrespective of its speed of translation.

The invention consists of a fairing having externally the shape of a mushroom and comprising two portions spaced apart from each other, an upper portion and a lower portion, between which there is formed a channel which constitutes the air intake of the driving system, the said driving system being installed between the two said portions, coaxially with the said mushroom-shaped fairing, the shape of the said channel being such that when the platform is in an upright equilibrium position the resultant of the horizontal impulses of the air on the platform in a relative horizontal movement of the platform with respect to the air, passes through the centre of gravity of the platform, irrespective of the direction of the said movement.

The invention also includes the platforms provided with the said fairing and comprising simple devices for obtaining equilibrium of the forces, either with a view to maintaining the platform in equilibrium or with the object of displacing it.

These platforms can be divided into two distinct classes, depending on whether their trim or inclination should be kept fixed or whether it can vary.

The description which follows below will make the invention more clearly understood, while bringing out further particular features and advantages.

It is particularly directed to preferred forms of construction, reference being made to the accompanying diagrammatic drawings, in which.

Figure 13:
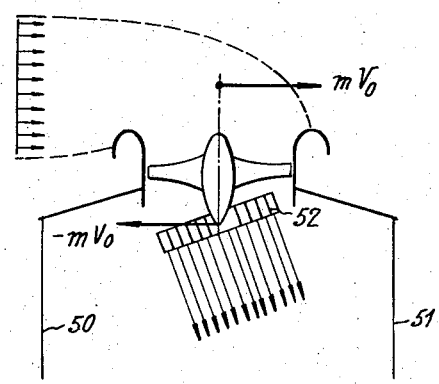
Figure 14:
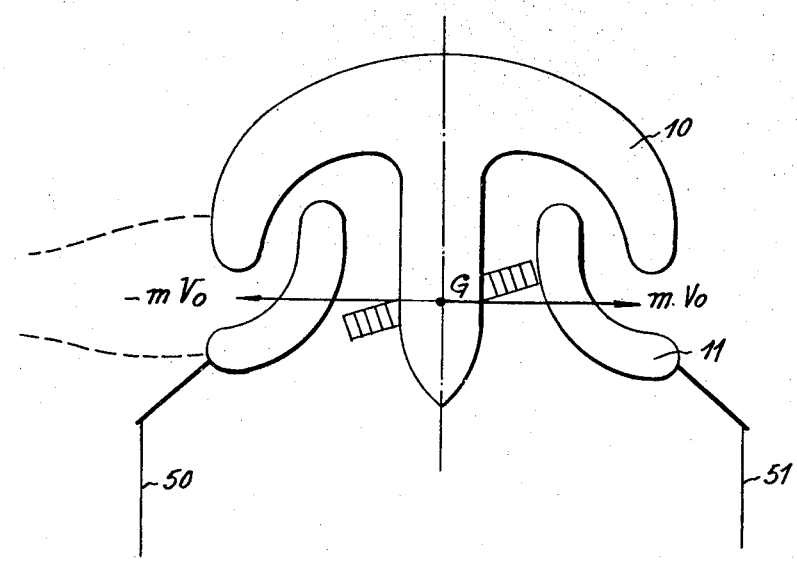

FIGS. 13 and 14 respectively show a conventional captive platform and a captive platform provided with the fairing according to the invention.

Reference will first be made to FIGS. 1 to 4, so as to become familiar with the problem to be resolved and to define the field in which the present invention is applicable.

Figure 1:
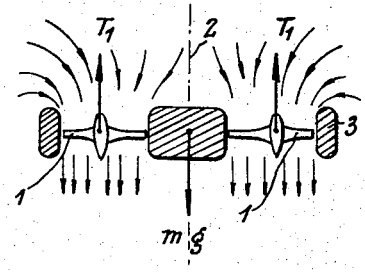
FIG. 1 is a vertical axial section of a conventional flying platform without a jet-deflecting device.

Flying platforms known at the present time (more by the basic research programs of which they have been the object than by the practical constructions which have undertaken as their result) are of a type shown in FIG. 1. The propulsion system is composed of a certain number of elementary air-screws 1 mounted between the central axis 2 and an outer ring 3. Each of the air-screws 1 supplies a vertical thrust $T_1$ the resultant of which is equal and opposite to the weight $mg$ of the platform when the latter is in equilibrium. Throughout the description which follows, the air-screws 1 may be replaced by turbo-jet engines.

Figure 2:
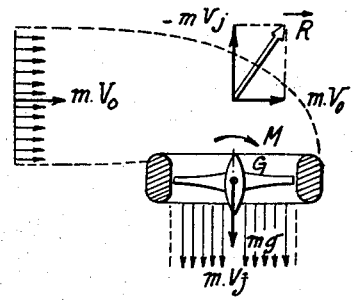
FIG. 2 shows the platform of FIG. 1 under the action of a strong gust of wind.

In order to simplify the drawings, it will now be assumed that the platform comprises only a single engine 1. In FIG. 2, the platform is displaced with a horizontal movement towards the left in an atmosphere at rest or, which amounts to the same thing, it is subjected to the action of a gust of wind coming from the left of the figure.

As a result of the relative movement, the frontier line of the tubular current of supply flux has the form indicated in FIG. 2. In accordance with the theorem of momentum, the platform is subjected to a resultant $\vec{R}$ which is obtained from the reaction $-m\vec{V_j}$ of the discharge impulse, and from the action of $m\vec{V_0}$ of the upstream flux. In view of the inclination of the resultant $\vec{R}$, the platform is not in equilibrium either with respect to force or to moment.

It can be seen that a necessary condition for equilibrium of the forces is that the horizontal component $mV_0$ of the upstream impulse should be compensated by an opposing reaction of a component of the discharge flow. This component can be obtained in principle by two methods:

(a) By inclining the whole of the platform in the direction meeting the relative air flow;
(b) By deflecting the discharge flow towards the downstream side by means of a grid of blades or any other deflection device.

Figure 3:
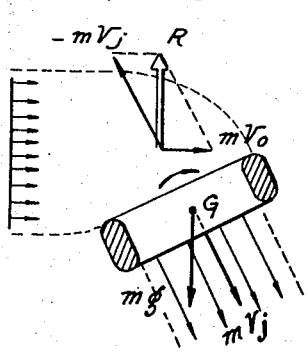

If the whole of the platform is inclined to meet the relative air flow as shown in FIG. 3, the thrust $mV_j$ due to the jet of air from the engine gives rise to a reaction $-mV_j$, the component of which for a given angle of inclination of the platform is equal and opposite to the impulse of the intake flux $mV_0$.

Figure 4:
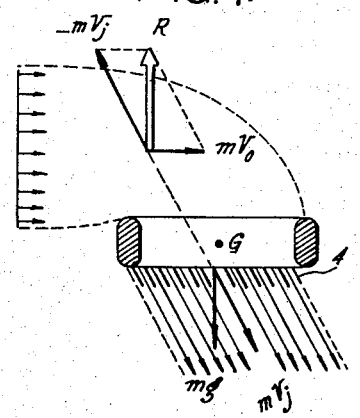
FIGS. 3 and 4 show the platform of FIGS. 1 and 2 with a jet-deflecting device.

If the parallel deflectors 4 of a fixed grid located in the discharge flow of the engine 1 are inclined as shown in FIG. 4, the deflectors being placed facing the relative air flow, the impulse of the jet is $mV_j$, and the resulting thrust $-mV_j$ gives a component which annuls the intake impulse $mV_0$ for a certain angle of inclination of the deflectors.

In both these cases however, the moment of R about the centre of gravity is not annulled (we are considering a "nose-up" moment). Studies have shown that the control moment necessary to annul the moment of R at G with equilibrium of the forces can only be obtained from the impulse derived from an auxiliary propulsion device acting with a large mechanical advantage.

It should however be observed that in the solution of FIG. 3, the balancing of the moments could theoretically be effected by raising the center of gravity along the axis of the rotor so as to bring it on the resultant R, that is to say on $mV_0$. In fact, such centering would assume a distribution of weights which would be incompatible with a rational arrangement. In addition, and more especially, the inclination of the device necessary for balancing the forces are considerable at moderate translation speeds or wind velocities. In the case of a vehicle with a human pilot or which carries a detection apparatus, such inclinations constitute inherent defects and make it necessary to install on the vehicle an element controlled in dependence on the horizontal plane. Finally, the line of action of the momentum $mV_0$ has an altitude referred to the vehicle which varies considerably with the speed, so that the raised centering would only produce equilibrium at a certain definite speed.

The solution of FIG. 4 has the advantage of eliminating any inclination of the vehicle, but lends itself still less to achievement of balance of the moments by acting on the height of the center of gravity G. A simple examination of the figure shows that, in this solution, the moment to be balanced remains constant for any displacement of the center of gravity along the axis of the platform.

Figure 5:
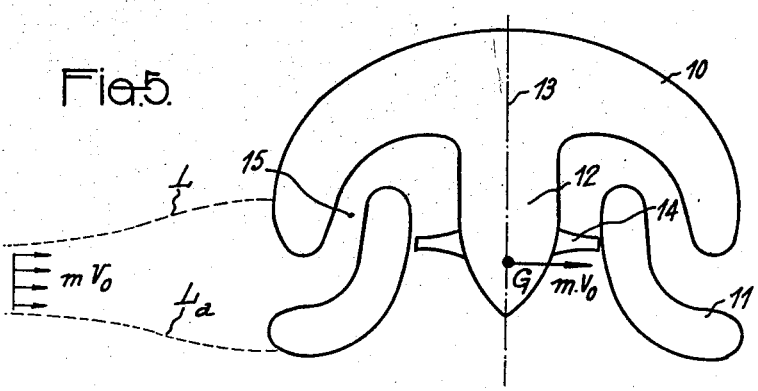
FIG. 5 shows the fairing in accordance with the invention.

The fairing of the invention and as shown in FIG. 5, has the external shape of a mushroom. It is composed of two portions spaced apart from each other, an upper portion 10 and a lower portion 11. The upper portion 10 comprises a central member 12 and the lower portion has the shape of a ring which is bell-shaped towards the bottom.

All these parts are bodies of revolution about the central axis 13. The propulsion unit is an air-screw 14 rotating inside the ring 11 and driven by an engine (not shown).

The free space or channel 15 existing between the upper portion 10 and the lower portion 11 of the fairing constitutes the air-intake channel for the air-screw 14.

The two portions 10 and 11 of the fairing are connected to each other by streamlined stays (not shown).

The walls of the channel 15, on each of the portions 10 and 11 of the fairing, are formed in such manner that the momentum of the upstream flux of the air-screw 14 passes through the centre of gravity G of the platform, or through a point in its immediate vicinity on the central axis 13, under all conditions of flight. If the platform is subjected to the action of a gust of wind coming from the left-hand side of FIG. 5, it is thus necessary that the impulse $mV_0$ of the flow of air comprised between the lines L and La in the plane of FIG. 5 also passes through the centre of gravity G or in its immediate vicinity on the central axis 13.

The moment of the upstream momentum is thus always zero or sufficiently small to be capable of being compensated by normal control surfaces, without calling on a source of external power.

Figure 6:
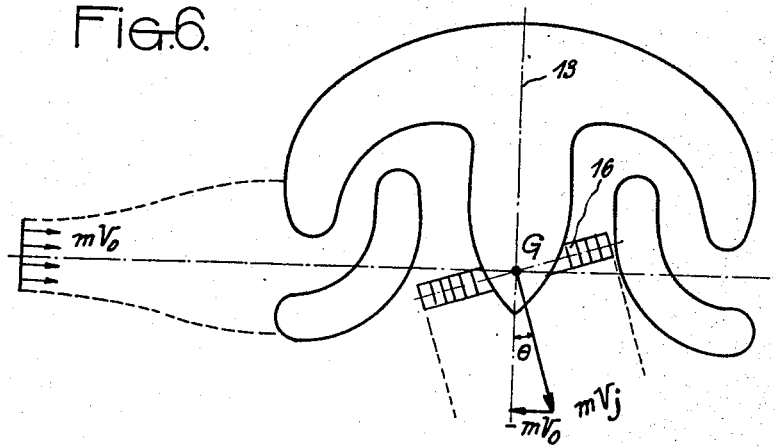
FIG. 6 shows a platform with an invariable trim, provided with a fairing according to the invention.

In FIG. 6, the platform provided with the fairing which annuls the moment of the upstream flux is completed by a device for annulling or creating a horizontal thrust, depending on whether the action of a gust of wind is compensated so as to keep the platform stationary or whether it is desired to displace the latter. This device is a grid of deflectors 16 which deflects the discharge momentum $mV_j$, like the conventional devices which have been referred to previously, the trim of this platform is invariable.

The deflectors 100 parallel to each other may be secured to the circular rings 101–102 in order to constitute the rigid deflection frame 16 of FIGURE 6.

The rigid frame 16 is, at the same time, capable of pivoting about the axis 13 of FIGURE 6, and about an axis passing through G, normal with respect to the axis 13.

As an example, those two degrees of freedom (read faculties) can be obtained by associating the exterior ring 101 with a crown 103 by means of two diametric axes secured to both the ring and the crown. Rollers such as 105 secured to 103 and provided with bearings move in circular raceways 106 provided in the fairing 11 of FIGURE 5.

The two diametric axial shafts 104 permit the rotation about an axis passing through G and perpendicular to 13.

Figure 7A:
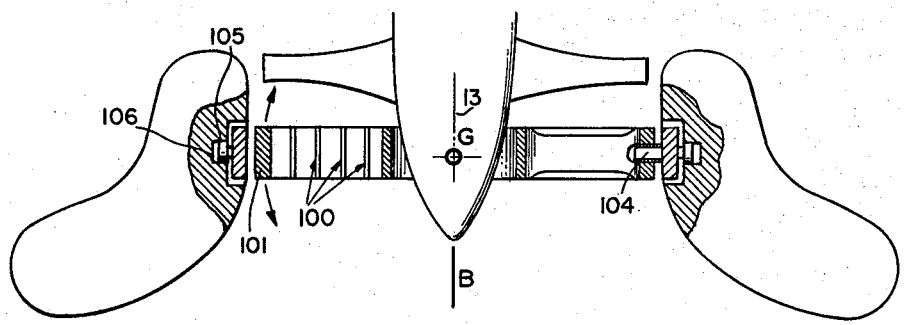
FIGS. 7A, 7B and 8A, 8B illustrate construction of the deflecting grid.
Figure 7B:
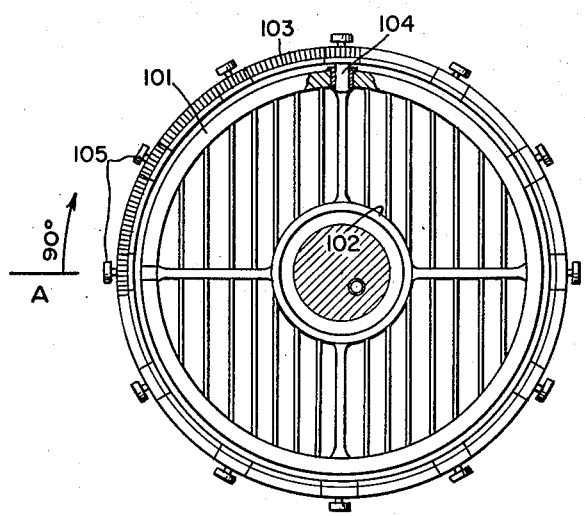
Figure 8A:
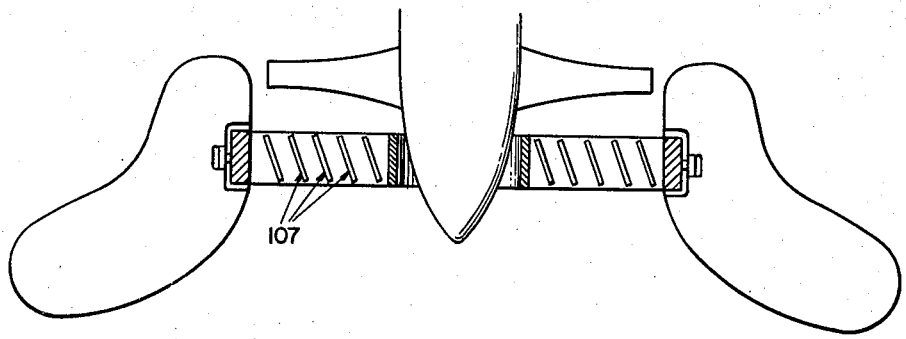
Figure 8B:
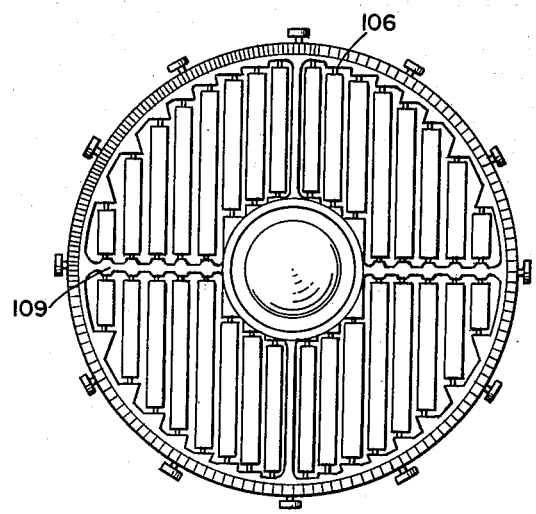

The deflectors can also constitute an articulated system, FIGURES 8A and 8B, about axial shafts 107 mobile on the crown 108 and the spacer 109. The rotation of that system about the axis 13 can be realized as it has been said in the description of FIGURES 7A and 7B (supra).

Figure 9:
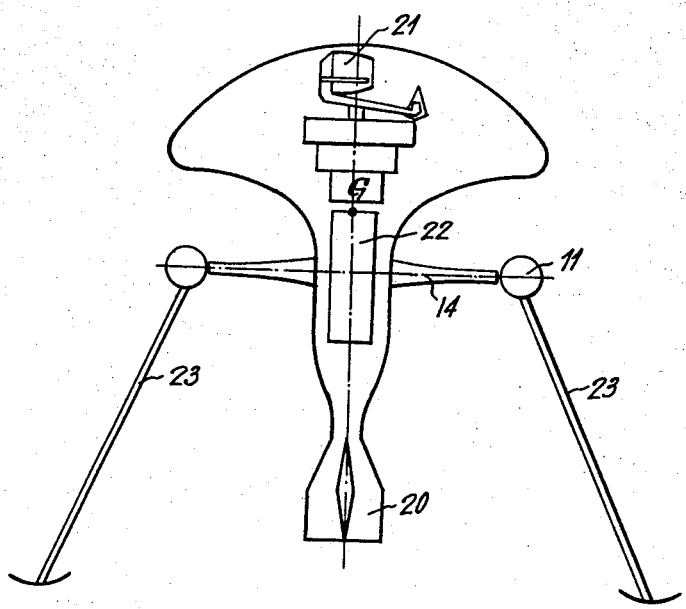
FIG. 9 shows a platform with variable trim, provided with the fairing according to the invention.

FIG. 9 shows, like FIG. 6, a platform provided with the fairing according to the invention, but its trim is variable.

The manoeuvring moment, which is equal to the moment of inertia during a change of trim to be made, can, to the extent that the angular accelerations to be annulled or to be created are moderate, be obtained by conventional controls 20 (depth and direction rudders) mounted in the jet of the air-screw 14. They can, in certain cases, be constituted by peripheral spoilers.

The platform shown in FIG. 9 is of the teleguided type and is intended to carry a radar apparatus 21. The air-screw 14 is driven by the engine 22. Two sets of supporting legs 23, provided with skids at their free extremities, are fixed on the lower portion 11 of the fairing so as to support the platform on the ground.

Figure 10:
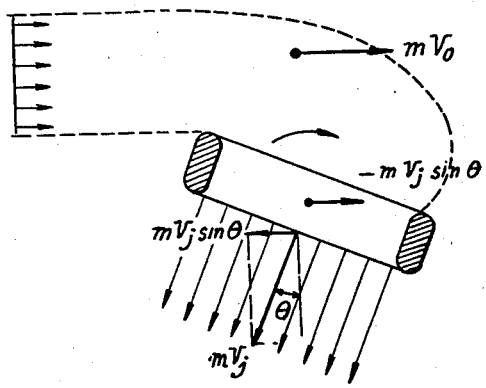
FIGS. 10 and 11 illustrate respectively the behaviour under a gust of wind of a conventional platform and of a platform provided with the fairing according to the invention.
Figure 11:
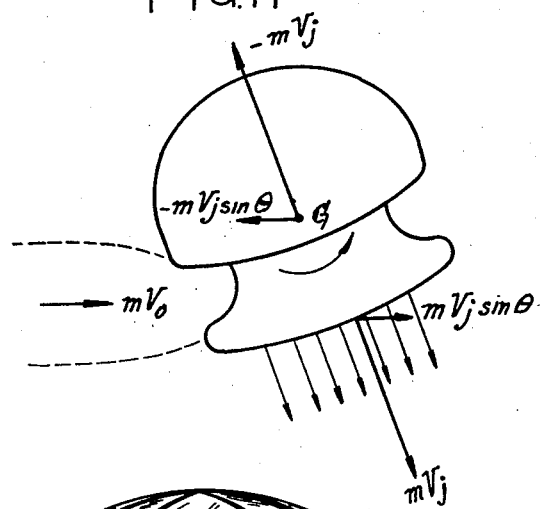

FIG. 11 shows a platform with variable trim. It is provided with control surfaces of any kind (not shown), and corresponds to the case where the inclinations of the platform may be very rapid, for example in the case in which it is stabilized geographically in spite of violent gusts of wind. FIG. 10 shows the behaviour of a normal platform under the influence of a gust of wind.

The characteristics of the platform of FIG. 11 are given below in a comparison with those of FIG. 10, with the description of the operation of platforms according to the invention.

Figure 12:
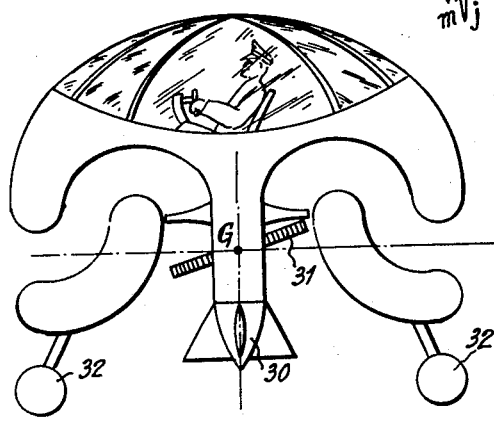
FIG. 12 shows a flying platform with an invariable trim and containing a human pilot.

FIG. 12 shows a flying platform with a human pilot, moving with a constant trim. The control surfaces are in this case on the one hand conventional control surfaces 30 and, on the other hand, a deflection grid 31 articulated with two degrees of freedom about the centre of gravity G. The control surfaces 30 and the grid 31 are actuated by the pilot in the usual manner.

The platform is provided with landing gear 32.

Finally, as shown in FIGS. 13 and 14, the platform may be linked to the ground or to a ship by thin cables 50, 51, . . . FIG. 13 shows a captive platform of known type, provided with a deflection grid 52. FIG. 14 shows the same platform provided with the fairing according to the invention.

The operation of the invention will be clear from the foregoing description and from an examination of the drawings.

The gust of wind coming from the left-hand side of FIG. 6 has the sole effect, since the fairing annuls the moments at G, of creating in the horizontal plane an impulse $mV_0$, applied at the centre of gravity G of the platform. This impulse, which should cause a corresponding horizontal relative displacement, is compensated by the operation of the deflection grid 16, either directly by hand or from a distance, or by an automatic pilot, thus creating an opposing impulse $-mV_j \sin \theta = -mV_0$. The trim of the platform has not varied.

The same gust of wind encountered by the platform of FIG. 9 results in the impulse $mV_0$ created at the centre of gravity being annulled by the operation of the conjoint control surfaces 20 in the usual manner. In this case, the control surfaces cause changes in the trim of the platform.

It has been indicated above, in the case of a platform of conventional construction, that the line of action of the force equivalent to the upstream momentum $mV_0$ passes generally above the centre of gravity G of the platform. The moment introduced is a "nose-up" moment.

Assuming that the impulse $mV_0$ is produced by a gust of wind acting on a platform initially in equilibrium while stationary, and therefore horizontal, it can be seen from FIG. 10 that the rotation induced by the moment at G of the impulse $mV_0$ produces a horizontal force $-mV_j \sin \theta$, where $\theta$ is the angle of inclination of the platform directed towards the right (in the direction of the gust of wind), and which is the horizontal component of the reaction of the discharge impulse $mV_j$.

This force is added to the air velocity impulse $mV_0$ so as to accelerate the departure of the platform in the direction of the gust of wind. The displacement from the geographical position (unbalance of the horizontal forces) is thus accentuated by the unbalance of the moments.

With the form of fairing proposed, the gust of air introduces no moment. The platform remains horizontal, and only the impulse force $mV_0$ contributes to its displacement.

In addition, the new fairing can also be designed in such manner that the wind impulse $mV_0$ causes a diving moment at G. The initial movement of inclination of the platform has then a direction such that the horizontal component of the reaction of the discharge impulse $-mV_0 \sin \theta$ tends to annul the gust impulse $mV_0$ and in consequence to attenuate the geographical displacement.

Naturally, a too-high position of the centre of gravity (or a too-low position of the annular intake opening) would again require moment control surfaces which would be difficult to dimension for the piloted phases. However, an acceptable compromise is always possible between this requirement and a displacement damped by the influence of an external perturbation.

In order to understand the operation and the advantages of the fairing according to the invention as applied to a captive platform, that is to say connected to earth by thin holding cables 50, 51 . . . , reference must be made to FIG. 13, which shows a conventional captive platform under the action of a gust of wind moving towards the right.

The essential performance demanded of such a platform in the majority of cases is geographical stability under the action of wind forces. This stability may be obtained as shown in FIG. 13, by deflecting the discharge impulse by means of the deflector 52, so as to oppose a reaction $-mV_0$ equivalent to the horizontal impulse $mV_0$ of the gust of wind. These two opposed forces have generally separate lines of action and in consequence form a couple at equilibrium. The gust of wind coming from the left, this couple has the effect of tensioning the cable 50 and slackening the cable 51, which involves:

(a) A substantial change of trim of the platform by the simple effect of the elasticity of the holding cables;

(b) The necessity of providing an excess of tractive force sufficient for the most violent wind not to cause any risk of slackening the downstream wires.

As shown in FIG. 14, the fairing according to the invention permits the impulse $mV_0$ of the gust of wind to be brought on to the line of action of the force $-mV_0$ set-up in opposition to it by the turning of the deflector. The diagram of forces at equilibrium is then symmetrical. The result is that:

(a) The tension of the upstream and downstream cables is identical, and the trim of the platform is constantly zero;

(b) The excess of tractive force to be provided over the weight is a minimum, since all of the cables retain the same tension, irrespective of the lateral wind.

It will of course be understood that the invention has only been described by way of explanation and not in any limitative sense, and that modifications of detail can be made thereto without thereby departing from the scope of the said invention.

I claim:

1. A fairing for self-propelled flying platform, the propulsion system of which draws in air from above and discharges said air substantially vertically downwards so as to create a vertical upward thrust, said fairing having the external shape of a mushroom and comprising: an upper portion, a lower portion spaced apart from said upper portion to form a channel, means for mounting said propulsion system between said upper and lower portions coaxially with said mushroom-shaped fairing, said channel including an air inlet to said propulsion system on the external surface of said fairing and substantially vertically centered with respect to a horizontal plane passing through the center of gravity of the platform when the platform is in an upright equilibrium position whereby, the resultant of the horizontal forces applied by the intake air to said platform, due to relative movement of the air and the platform, passes through the centre of gravity of the platform, irrespective of the direction of said movement.

2. A fairing as claimed in claim 1, in which said upper portion comprises a downwardly projecting central member and said lower portion has the shape of a ring, both upper and lower portions being bodies of revolution about the central axis of said platform.

3. A fixed-trim self-propelled flying platform provided with a fairing as claimed in claim 1, in which a jet-deflection device is installed on the discharge flow of said propulsion system, the centre of thrust of said deflection device being coincident with the centre of gravity of said platform, and said deflection device being articulated about said centre of gravity with two degrees of freedom.

4. A self-propelled flying platform as claimed in claim 3, in which said jet-deflection device comprises a plurality of parallel fixed deflectors rigidly mounted in a ring, said ring being articulated with two degrees of freedom about the centre of gravity of said platform.

5. A variable-trim self-propelled flying platform provided with a fairing as claimed in claim 1, in which the central member of the upper portion of said fairing comprises a conventional tail unit including side rudder and depth rudder with local manual controls.

6. A variable-trim self-propelled flying platform as claimed in claim 5, in which said manual controls are operated remotely.

7. A variable-trim self-propelled flying platform provided with a fairing as claimed in claim 1, in which the central member of the upper portion of said fairing comprises a conventional tail unit including side rudder and depth rudder with controls actuated by an automatic pilot device.

8. A captive self-propelled flying platform comprising a fairing as claimed in claim 1, said platform being connected to the ground by metal cables, the propulsion unit of said platform being provided with a jet-deflection device having a center or thrust coincident with the center of gravity of said platform associated with its discharge outlet.

9. A fixed-trim self-propelled flying platform provided with a fairing as claimed in claim 1, in which a jet-deflection device is installed on the discharge flow of said propulsion system, the center of thrust of said deflection device being coincident with the center of gravity of said platform, said jet-deflection device including a plurality of parallel articulated deflectors, each deflector being individually pivoted about an axis perpendicular to the central axis of said platform, said deflection device being rotatable about said central axis.

References Cited in the file of this patent

UNITED STATES PATENTS

| | | |
|---|---|---|
| 2,879,014 | Smith et al. | Mar. 24, 1959 |
| 2,936,972 | Zinavage | May 17, 1960 |
| 2,953,320 | Parry | Sept. 20, 1960 |
| 2,969,936 | Dorman | Jan. 31, 1961 |
| 2,972,455 | Borchers | Feb. 21, 1961 |
| 2,980,365 | Yoha | Apr. 18, 1961 |
| 2,990,137 | Willis | June 27, 1961 |
| 3,002,709 | Cochran | Oct. 3, 1961 |
| 3,054,578 | Brocard | Sept. 18, 1962 |